(12) United States Patent
Igari

(10) Patent No.: US 11,827,116 B2
(45) Date of Patent: Nov. 28, 2023

(54) POWER SUPPLY APPARATUS, VEHICLE AND CONTROL METHOD

(71) Applicant: Panasonic Intellectual Property Management Co., Ltd., Osaka (JP)

(72) Inventor: Syuhei Igari, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/684,069

(22) Filed: Mar. 1, 2022

(65) Prior Publication Data

US 2022/0289052 A1 Sep. 15, 2022

(30) Foreign Application Priority Data

Mar. 9, 2021 (JP) ................................. 2021-037358

(51) Int. Cl.
| | |
|---|---|
| B60L 53/20 | (2019.01) |
| H02M 7/12 | (2006.01) |
| B60L 53/22 | (2019.01) |
| H02M 7/06 | (2006.01) |
| H02M 1/32 | (2007.01) |

(52) U.S. Cl.
CPC ............... *B60L 53/22* (2019.02); *H02M 1/32* (2013.01); *H02M 7/062* (2013.01); *H02M 7/125* (2013.01)

(58) Field of Classification Search
CPC ......... B60L 53/22; H02M 1/32; H02M 7/062; H02M 7/125; H02M 1/0048; H02M 1/007; H02M 1/44; H02M 7/08; H02M 1/4208; H02M 1/4216; H02M 7/04; H02M 7/12; H02J 7/00302; H02J 7/0063; H02J 7/0068; H02J 7/007; H02J 7/06
USPC .......................................................... 307/9.1
See application file for complete search history.

(56) References Cited

U.S. PATENT DOCUMENTS

| | | | |
|---|---|---|---|
| 2016/0380429 A1* | 12/2016 | Krstic | .................... H02H 7/125 307/77 |
| 2019/0036462 A1* | 1/2019 | Tazaki | .................... H02M 7/06 |

FOREIGN PATENT DOCUMENTS

| | | |
|---|---|---|
| JP | 2017-169350 A | 9/2017 |
| JP | 2021-37358 A | 3/2021 |

* cited by examiner

*Primary Examiner* — Rexford N Barnie
*Assistant Examiner* — Xuan Ly
(74) *Attorney, Agent, or Firm* — Seed IP Law Group LLP

(57) ABSTRACT

Provided is a power supply apparatus that supplies power received from an external power supply to a load, the power supply apparatus comprising: a plurality of power supply circuitries, each of which has switching elements, that are allowed to supply power to the load separately; and a processor that controls a number of the power supply circuitries supplying power to the load according to a required power level of the load.

19 Claims, 3 Drawing Sheets

POWER SUPPLY APPARATUS, VEHICLE AND CONTROL METHOD

TECHNICAL FIELD

The present disclosure relates to a power supply apparatus, a vehicle and a control method.

BACKGROUND ART

Conventionally, a power supply apparatus has been known, which includes a plurality of power supply circuitries. In such a power supply apparatus, when the power supply apparatus is connected to an external power supply, the power supply apparatus operates all the plurality of power supply circuitries in parallel to supply power to a load.

For example, the related art discloses a configuration that supplies power to a load by operating a plurality of power supply circuitries in parallel, which connected to each phase of a multiple-phase external power supply.

CITATION LIST

Patent Literature

PTL 1: Japanese Patent Application Laid-Open No. 2017-169350

SUMMARY OF INVENTION

Solution to Problem

A power supply apparatus according to an embodiment of the present disclosure supplies power received from an external power supply to a load, the power supply apparatus comprising:
 a plurality of power supply circuitries, each of which has switching elements, that are allowed to supply power to the load separately; and
 a processor that controls a number of the power supply circuitries supplying power to the load according to a required power level of the load.

A vehicle according to an embodiment of the present disclosure includes:
 a load; and
 the above-described power supply apparatus.

A control method according to an embodiment of the present disclosure, of a power supply apparatus that includes a plurality of power supply circuitries, each of which has switching elements, and supplies power received from an external power supply to a load, the control method comprising:
 controlling a number of the power supply circuitries supplying power to the load according to a required power level of the load; and
 controlling the plurality of the power supply circuitries separately based on the number of the power supply circuitries.

Advantageous Effects of Invention

According to an embodiment of the present disclosure, it is possible to improve power efficiency and EMI performance.

DESCRIPTION OF EMBODIMENTS

Embodiment

Figure 1:
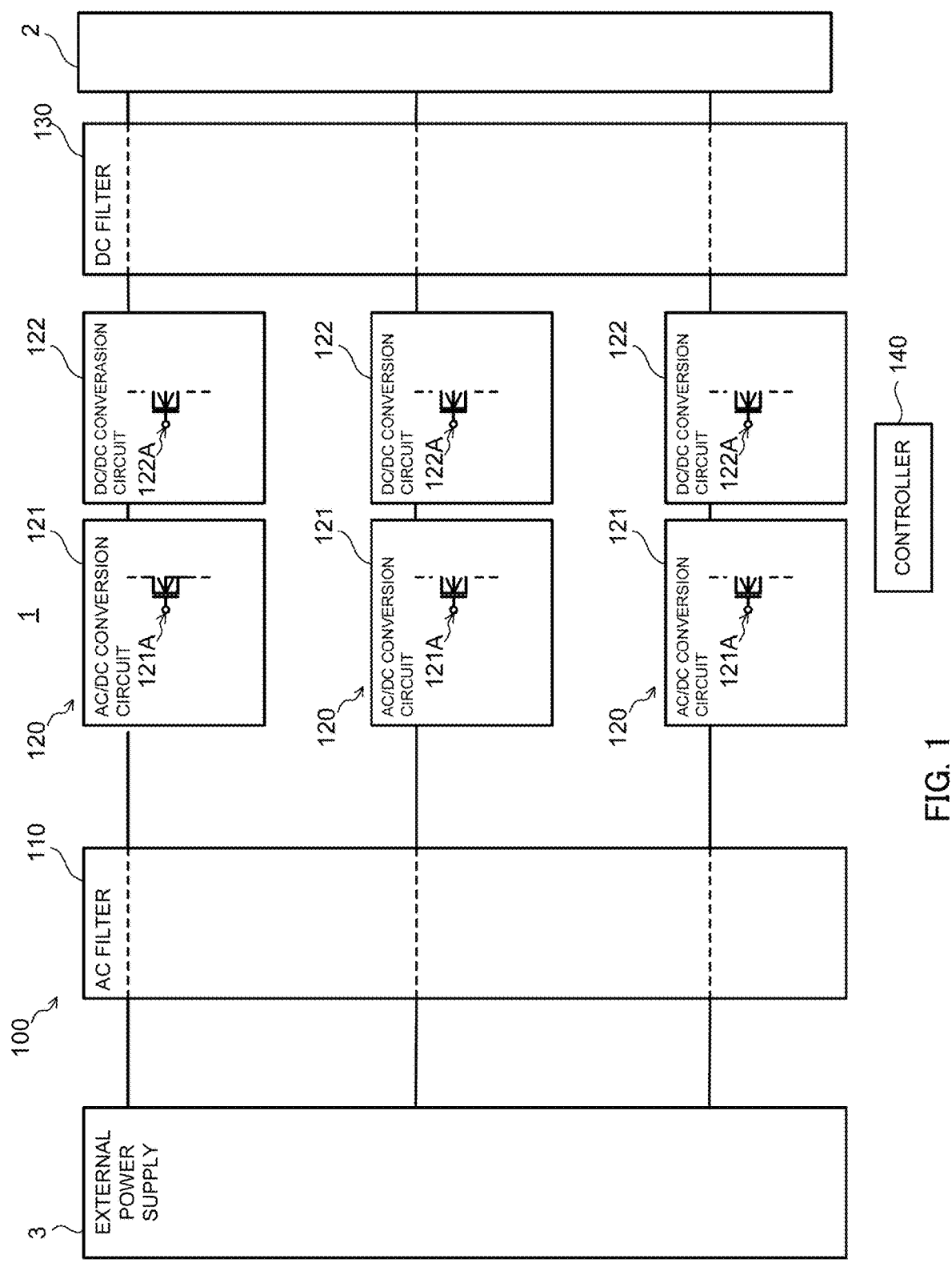
FIG. 1 is a diagram illustrating a vehicle including a power supply apparatus according to an embodiment of the present disclosure.

Hereinafter, embodiments of the present disclosure will be described in detail with reference to the accompanying drawings. FIG. 1 is a block diagram illustrating a configuration example of a vehicle 1 provided with a power supply apparatus 100 according to an embodiment of the present disclosure.

As illustrated in FIG. 1, the power supply apparatus 100 is for example, a charger to charge a battery 2 (a load) mounted on the vehicle 1 and operates by power being supplied from an external power supply 3 (an AC power supply). The external power supply 3 may be any AC power supply such as a single-phase power supply and a three-phase power supply.

The power supply apparatus 100 includes an AC filter 110, three power supply circuitries 120, a DC filter 130, a controller 140 and the like.

The AC filter 110, the three power supply circuitries 120 and the DC filter 130 are circuits to convert power received from the external power supply 3 into power to charge the battery 2.

The AC filter 110 removes noise superimposed on the AC power input from the external power supply 3 and outputs an AC power to each of the three power circuitries 120. Note that the AC filter 110 may be shared by the three power supply circuitries 120 or be provided on each of the three power supply circuitries 120.

The three power supply circuitries 120 are connected to the battery 2 in parallel and are configured to be capable of supplying power to the battery 2 separately. Each of the three power supply circuitries 120 has a uniform configuration and includes an AC/DC conversion circuit 121 and a DC/DC conversion circuit 122.

The AC/DC conversion circuit 121 converts the AC power received from the external power supply 3 into the DC power and includes a rectifier, a power factor correction circuit and the like. The AC/DC conversion circuit 121 (the power factor correction circuit) includes switching elements 121A, and the controller 140 controls a switching operation of the switching elements 121A and the like.

The DC/DC conversion circuit 122 converts the DC power obtained from the AC/DC conversion circuit 121 into the DC power that is capable of charge the battery 2. The DC/DC conversion circuit 122 includes switching elements 122A, and the controller 140 controls a switching operation of the switching elements 122A and the like.

Moreover, the three power supply circuitries 120 are configured to be capable of operating separately. Specifically, the three power supply circuitries 120, under control of the controller 140, can operate in any one of a first operating state, a second operating state and a third operating state. The first operating state is a state in which one of the three power supply circuitries 120 is active and the other two are inactive. The second operating state is a state in which two of the three power supply circuitries 120 are active and the other one is inactive. The third operating state is a state in which all the three power supply circuitries 120 are active. That is, the controller 140, when neither of the three power supply circuitries 120 is active, causes all the power supply circuitries 120 to be inactive.

In the first operating state and the second operating state, the inactive power supply circuitries 120 are not supplied with power from the external power supply 3, for example, by a switch (not shown) cutting off a power line connecting between the power supply circuitry 120 and the external power supply 3 and the like, and the switching operation of the switching elements are not controlled.

The DC filter 130 reduces noises superimposed on the DC power obtained from the three power supply circuitries 120, respectively, and outputs the noise-reduced power to the battery 2. Note that the DC filter 130 may be shared with the three power supply circuitries 120 or be provided on each of the three power supply circuitries 120.

When the DC power which is converted by the power supply apparatus 100 is supplied to the battery 2 in this manner, the battery 2 is charged.

The controller 140 includes a central processing unit (CPU) (not illustrated), a read only memory (ROM) (not illustrated), a random access memory (RAM) (not illustrated), and an input/output circuit (not illustrated). The controller 140 is configured to control each of the power supply circuitries 120 (the switching elements) based on a preset program.

Since the three power supply circuitries 120 have a uniform configuration, it is possible to supply the battery 2 with three times as much power as a maximum value of power output by only one power supply circuitry 120 (the first operating state) when all the three power supply circuitries 120 operate in parallel (the third operating state).

Figure 2:
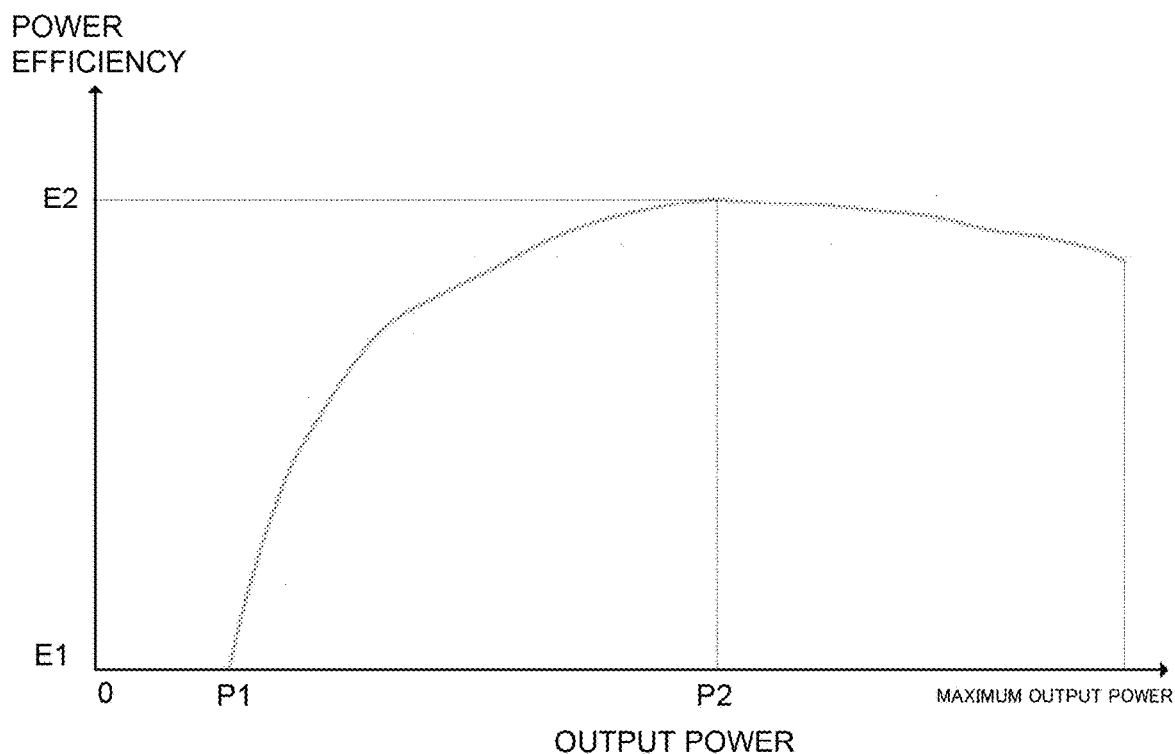
FIG. 2 is a diagram illustrating a relationship of between output power and power efficiency when all three power supply circuitries are operated in parallel.

It is experimentally confirmed that power efficiency, which is the ratio of output power to input power, changes as illustrated in FIG. 2 according to an output power level when all the three power supply circuitries 120 operate in parallel.

Specifically, the power efficiency is equal to E1 approximately at P1 which corresponds to output power of about ⅛ of the maximum output power, and as the output power level is larger than P1, the power efficiency increases. Then, the power efficiency reaches the maximum E2 approximately at P2 which corresponds to output power of about ½ of the maximum output power. For subsequent output powers, the power efficiency changes within a relatively stable range, slightly lower than E2.

The maximum output power is a maximum value of power that can be input during activation of all the three power supply circuitries 120.

From this result, for example, when the output power is relatively low such as the output power that is lower than about ½ of the maximum output power, the power efficiency is significantly worse than the case of relatively high output power such as the output power that is higher than about ½ of the maximum output power.

The output power is adjusted according to the output power required for the side of the battery 2 (hereinafter required power). The required power is power that is set as supplied power to the battery 2 and is determined, for example, on the basis of the amount of electricity stored in the battery 2, the amount of power according to user request and the like.

Considering the change of the power efficiency as illustrated in FIG. 2, when the required power is set to a lower level, supplying power to the battery 2 in the third operating state, where all the three power supply circuitries 120 operate in parallel, deteriorates the power efficiency.

In view of this, the controller 140 controls the number of the power supply circuitries 120 supplying power to the battery 2 according to a required power level. Specifically, the controller 140 determines the number of the power supply circuitries 120 such that the number of the power supply circuitries 120 supplying power to the battery 2 decreases as the required power level is set to be smaller.

The maximum value of the output power of one of the power supply circuitries 120 is ⅓ of the maximum value of the total output power of all the three power supply circuitries 120. Therefore, for example, when the required power of the battery 2 is equal to or lower than ⅓ of the maximum value of the total output power, the controller 140 determines that the number of the power supply circuitries 120 is equal to one and controls the three power supply circuitries 120 under the first operating state.

Moreover, for example, when the required power of the battery 2 is higher than ⅓ of the maximum value of the total output power and is lower than ⅔ of the maximum value of the total output power, the controller 140 determines that the number of the power supply circuitries 120 is equal to two and controls the three power supply circuitries 120 under the second operating state.

Further, for example, when the required power of the battery 2 is higher than ⅔ of the maximum value of the total output power, the controller 140 determines that the number of the power supply circuitries 120 is equal to three and controls the three power supply circuitries 120 underin the third operating state.

Figure 3:
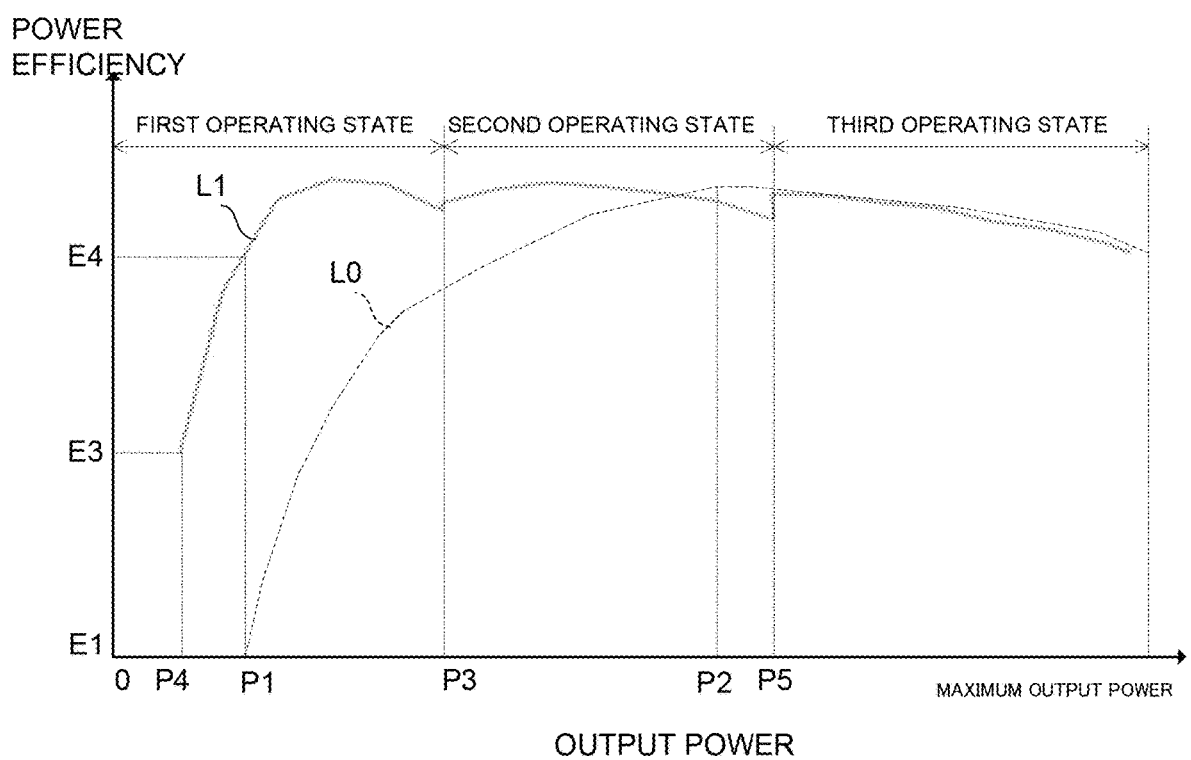
FIG. 3 is a diagram illustrating a relationship of between output power and power efficiency in a control of the present embodiment.

In this manner, for example, as illustrated in FIG. 3, it can be experimentally confirmed that the power efficiency within a range below ⅓ of the maximum output power (the range from 0 to P3) in the first operating state (the solid line L1) is more significantly improved than that of the case of all the three power supply circuitries 120 operating in parallel (the broken line L0).

Specifically, at the output power P4 lower than P1, the power efficiency of the first operating state is equal to E3 which is higher than E1 (about 3 percent higher than E1). Moreover, at the output power P1, the power efficiency of the first operating state is equal to E4 which is higher than E1 (about 5 percent higher than E1). The value E1 as mentioned above corresponds to the power efficiency in the case where the output power is P1 and all the three power supply circuitries 120 operate in parallel.

In addition, it can be experimentally confirmed that the power efficiency within a range from ⅓ to ⅔ of the maximum output power (the range from P3 to P5) in the second operating state is more improved as a whole than the power efficiency of the case of all the three power supply circuitries 120 operating in parallel (the broken line L0). In particular, it can be confirm that the power efficiency is more significantly improved than the broken line L0 as the output power is smaller.

That is, in the present embodiment, it is possible to improve the power efficiency if the required power level is relatively small.

Further, in the third operating state in which the output power is higher than ⅔ of the maximum output power, since the power efficiency is almost the same as that of the broken line L0, it is possible to achieve high levels of the power efficiency.

By the way, when the three power supply circuitries 120 operate in parallel, noise such as switching noise is generated in the respective three power supply circuitries 120 due to a switching control of the switching elements in each of the power supply circuitries 120. Therefore, since superposition of the noise in the three power supply circuitries 120 occurs, it is difficult to improve EMI performance.

In contrast, in the present embodiment, since all the three power supply circuitries 120 do not operate in parallel when the required power level is relatively small, not operating power supply circuitries 120 stop. Therefore, since noise is not generated in the not operating power supply circuitries 120, it is possible to reduce the noise as a whole. Consequently, it is possible to improve the EMI performance.

Moreover, the controller 140 selects operating power supply circuitry 120 after determining the number of the power supply circuitries 120. Specifically, the controller 140 selects the power supply circuitry 120 supplying power to the battery 2 according to durability condition of the plurality of power supply circuitries 120 respectively.

For example, when the number of the power supply circuitries 120 is equal to one, the controller 140 selects the least frequently used power supply circuitry 120 in the three power supply circuitries 120. In addition, when the number of the power supply circuitries 120 is equal to two, the controller 140 selects the least frequently used power supply circuitry 120 and the second least frequently used power supply circuitry 120 in the three power supply circuitries 120.

In this manner, it is possible to suppress occurrence of significantly overused power supply circuitry 120 in the three power supply circuitries 120 and to easily equalize the durability condition of the three power supply circuitries 120.

By the way, during charging the battery 2, a control of changing the required power level may be performed. Such the control is to reduce the required power level to prevent the battery 2 from being overcharged when the charge amount of the battery 2 approaches the maximum charge amount by charging the battery 2 with relatively large required power level corresponding to the third operating state, for example.

When reducing the required power level to the power range corresponding to the first operating state or the second operating state, it is considered possible to prevent decreasing the power efficiency by reducing the number of the active power supply circuitries 120 accordingly.

Therefore, the controller 140, when operating at least two power supply circuitries 120 to charge the battery 2, may decrease the at least two power supply circuitries 120 according to remaining charge of the battery 2.

In this manner, it is possible to prevent decreasing the power efficiency and overcharging of the battery 2.

Moreover, when the required power level is set and the number of the active power supply circuitries 120 is determined by the controller 140, the external power supply 3 may not be able to input the set power. Specifically, when a maximum supplying power of the external power supply 3 is smaller than the required power level, charging of the battery 2 is performed by an output power level which is smaller than the required power level.

For example, even in the case where the number of the power supply circuitries 120 is determined by the controller 140 to be equal to two, when the output power corresponds to the power range of the case of the number of the power supply circuitries 120 being equal to one, the power efficiency decreases due to a large number of the power supply circuitries 120.

Therefore, when the required power level is larger than input power from the external power supply 3 after the number of the active power supply circuitries 120 is determined according to the required power level, the controller 140 may decrease the number of the active power supply circuitries 120 according to the input power.

For example, when the required power level is within a range of the second operating state and the output power corresponding to the input power is within a range of the first operating state, the controller 140 changes the number of the power supply circuitries 120 from two to one.

In this manner, it is possible to suppress decreasing of the power efficiency due to circumstances of the input power from the external power supply 3.

Figure 4:
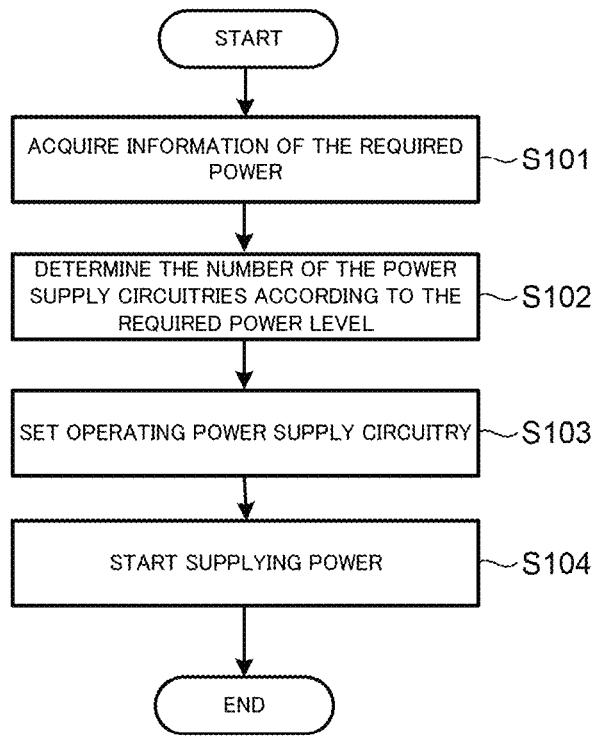
FIG. 4 is a flowchart of an exemplary operation of a power supplying control in a controller.

An exemplary operation example of power supply control by the controller 140 configured in the above manner will be described. FIG. 4 is a flowchart illustrating an exemplary operation of the power supply control by the controller 140. Processing in FIG. 4 is performed when the power supply apparatus 100 is connected to the external power supply 3, for example.

As illustrated in FIG. 4, the controller 140 acquires information of the required power for the battery 2 (step S101). Then, the controller 140 determines the number of the power supply circuitries 120 according to the required power level (step S102).

After determining the number of the power supply circuitries 120, the controller 140 selects which of the power supply circuitries 120 to activate and sets the selected one or ones (step S103). Then, the controller 140 starts supplying power by the set power supply circuitry (step S104). Thereafter, the control is completed.

According to the present embodiment configured as described above, since the number of the active power supply circuitries 120 is controlled according to the required power level, it is possible to reduce the number of the active power supply circuitries 120 for a lower level of the required power.

Consequently, it is possible to improve the power efficiency when the required power level is relatively small.

In addition, since the number of the active power supply circuitries 120 for a lower level of the required power is decreased, it is possible to decrease the number of the switching elements where the switching control is conducted. Consequently, it is possible to reduce noise of the power supply apparatus 100 as a whole, and to improve the EMI performance.

Figure 5:
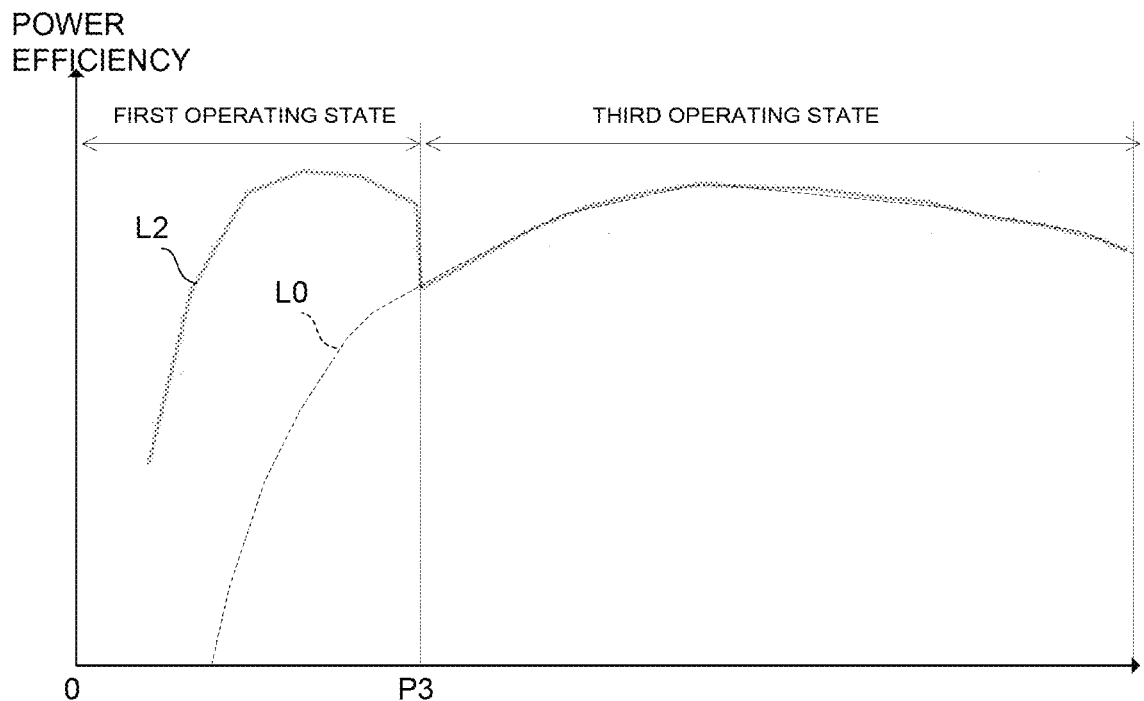
FIG. 5 is a diagram illustrating a relationship of between output power and power efficiency in a control of a variation.

In the above-described embodiments, the number of active ones of the three power supply circuitries 120 is controlled in three steps of the first operating state, the second operating state and the third operating state, but the present disclosure is not limited to this. For example, as illustrated in FIG. 5, the number of active ones of the three power supply circuitries 120 may be controlled in two steps of the first operating state and the third operating state (the solid line L2).

The output power in the range from 0 to P3 may have the greatest discrepancy between the solid line L2 and the broken line L0 in the power efficiency. Therefore, by controlling the number of the power supply circuitries 120 only in the range, the control can be simplified. However, from a view point of noise reduction, it is preferable to control the number of the active power supply circuitries 120 in the three steps of the first operating state, the second operating state and the third operating state.

In addition, in the above-described embodiments, selection as to which of the power supply circuitries 120 supply power with the battery 2 is made according to the durability condition of the three power supply circuitries 120, but the present disclosure is not limited to this, and for example, the power supply circuitries 120 may be cyclically selected.

Moreover, the controller 140 may select the power supply circuitry 120 according to arrangement states of the three power supply circuitries 120. For example, when two adjacent power supply circuitries 120 are activated in the second operating state, noise may be easily superimposed.

Therefore, in the three power supply circuitries arranged side by side, the power supply circuitry arranged in the middle is inactive and two power supply circuitries arranged on both sides of the stopped power supply circuitry are active under the second operating state, for example.

In this manner, since the inactive power supply circuitry positions between the active two power supply circuitries, the active two power supply circuitries are positioned apart from each other. Therefore, noise generated in each the power supply circuitry is hard to be superimposed and noise can be reduced as a whole.

Furthermore, in the above-described embodiments, the three power supply circuitries are provided, but the present disclosure is not limited to this, and two power supply circuitries may be provided or, four or more power supply circuitries may be provided.

Furthermore, in the above-described embodiments, while the battery is exemplified as a load, but the present disclosure is not limited to this, and the load may be other than the battery.

Furthermore, in the above-described embodiments, while one including the AC/DC conversion circuit and the DC/DC conversion circuit is exemplified as a power supply circuitry, but the present disclosure is not limited to this, and the power supply circuitry may be other circuitry including switching elements.

Furthermore, in the above-described embodiments, the power supply apparatus is mounted on the vehicle, but the present disclosure is not limited to this, and the power supply apparatus may not be mounted on the vehicle.

The embodiments described above are merely examples of specific implementation of the present disclosure, and the technical scope of the present disclosure should not be restrictively interpreted by these embodiments. That is, the present disclosure may be implemented in various forms without departing from the spirit thereof or the major features thereof.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2021-037358, filed on Mar. 9, 2021, the disclosure of which including the specification, drawings and abstract is incorporated herein by reference in its entirety.

INDUSTRIAL APPLICABILITY

The power supply apparatus of the present disclosure is useful as power supply apparatuses, vehicles and control methods that achieve improvement of the power efficiency and the EMI performance.

The invention claimed is:

1. A power supply apparatus for supplying power received from an external power supply to a load, the power supply apparatus comprising:
 a plurality of power supply circuitries connected in parallel, each of which has switching elements, that are allowed to supply power to the load separately; and
 a processor that, in operation, controls a number of the power supply circuitries supplying power to the load according to a required power level of the load,
 wherein the processor determines the number of the power supply circuitries such that the number of the power supply circuitries supplying power to the load decreases as the required power level is set to be smaller,
 wherein when the required power level of the load is equal to or lower than ⅓ of the maximum value of a total output power, the processor controls the power supply circuit so that the number of the power supply circuits supplying the power to the load is one,
 wherein when the required power level of the load is higher than ⅓ of the maximum value of the total output power and is lower than ⅔ of the total output power, the processor controls the power supply circuit so that the number of the power supply circuits supplying the power to the load is two, and
 wherein when the required power level of the load is higher than ⅔ of the maximum value of the total output power, the processor controls the power supply circuit so that the number of the power supply circuits supplying the power to the load is three.

2. The power supply apparatus according to claim 1, wherein
 each of the plurality of power supply circuitries is allowed to operate separately, and
 the processor, when neither of all the power supply circuitries is active, causes all the plurality of power supply circuitries to be inactive.

3. The power supply apparatus according to claim 1, wherein the processor selects the power supply circuitry supplying power to the load according to durability condition of the plurality of power supply circuitries respectively.

4. The power supply apparatus according to claim 1, wherein the load is a battery.

5. The power supply apparatus according to claim 4, wherein the processor, when operating at least two power supply circuitries to charge the battery, decreases the at least two power supply circuitries according to remaining charge of the battery.

6. The power supply apparatus according to claim 1, wherein when the required power level is larger than input power from the external power supply after the number of the power supply circuitries is determined according to the required power level, the processor decreases the number of the power supply circuitries according to the input power.

7. The power supply apparatus according to claim 1, wherein each of the plurality of power supply circuitries is allowed to operate separately, and the processor, when neither of all the power supply circuitries is active, causes all the plurality of power supply circuitries to be inactive.

8. The power supply apparatus according to claim 1, wherein the processor selects the power supply circuitry supplying power to the load according to durability condition of the plurality of power supply circuitries respectively.

9. The power supply apparatus according to claim 2, wherein the processor selects the power supply circuitry supplying power to the load according to durability condition of the plurality of power supply circuitries respectively.

10. The power supply apparatus according to claim 1, wherein the load is a battery.

11. The power supply apparatus according to claim 2, wherein the load is a battery.

12. The power supply apparatus according to claim 3, wherein the load is a battery.

13. The power supply apparatus according to claim 10, wherein the processor, when operating at least two power supply circuitries to charge the battery, decreases the at least two power supply circuitries according to remaining charge of the battery.

14. The power supply apparatus according to claim 11, wherein the processor, when operating at least two power supply circuitries to charge the battery, decreases the at least two power supply circuitries according to remaining charge of the battery.

15. The power supply apparatus according to claim 12, wherein the processor, when operating at least two power supply circuitries to charge the battery, decreases the at least two power supply circuitries according to remaining charge of the battery.

16. The power supply apparatus according to claim 1, wherein when the required power level is larger than input power from the external power supply after the number of the power supply circuitries is determined according to the required power level, the processor decreases the number of the power supply circuitries according to the input power.

17. The power supply apparatus according to claim 2, wherein when the required power level is larger than input power from the external power supply after the number of the power supply circuitries is determined according to the required power level, the processor decreases the number of the power supply circuitries according to the input power.

18. A vehicle, comprising:
a load; and
a power supply apparatus that, in operation, supplies power received from an external power supply to the load, the power supply apparatus comprising:
a plurality of power supply circuitries connected in parallel, each of which has switching elements, that are allowed to supply power to the load separately; and
a processor that, in operation, controls a number of the power supply circuitries supplying power to the load according to a required power level of the load,
wherein the processor determines the number of the power supply circuitries such that the number of the power supply circuitries supplying power to the load decreases as the required power level is set to be smaller,
wherein when the required power level of the load is equal to or lower than 1/3 of the maximum value of a total output power, the processor controls the power supply circuit so that the number of the power supply circuits supplying the power to the load is one,
wherein when the required power level of the load is higher than 1/3 of the maximum value of the total output power and is lower than 2/3 of the total output power, the processor controls the power supply circuit so that the number of the power supply circuits supplying the power to the load is two, and
wherein when the required power level of the load is higher than 2/3 of the maximum value of the total output power, the processor controls the power supply circuit so that the number of the power supply circuits supplying the power to the load is three.

19. A control method of a power supply apparatus that includes a plurality of power supply circuitries, each of which has switching elements connected in parallel, and supplies power received from an external power supply to a load, the control method comprising:
determining a number of the power supply circuitries supplying power to the load according to a required power level of the load; and
controlling the plurality of the power supply circuitries separately based on the number of the power supply circuitries,
wherein the determining includes determining the number of the power supply circuitries such that the number of the power supply circuitries supplying power to the load decreases as the required power level is set to be smaller,
wherein when the required power level of the load is equal to or lower than 1/3 of the maximum value of a total output power, the controlling includes controlling the power supply circuit so that the number of the power supply circuits supplying the power to the load is one,
wherein when the required power level of the load is higher than 1/3 of the maximum value of the total output power and is lower than 2/3 of the total output power, the controlling includes controlling the power supply circuit so that the number of the power supply circuits supplying the power to the load is two, and
wherein when the required power level of the load is higher than 2/3 of the maximum value of the total output power, the controlling includes controlling the power supply circuit so that the number of the power supply circuits supplying the power to the load is three.

* * * * *